Figure 5:
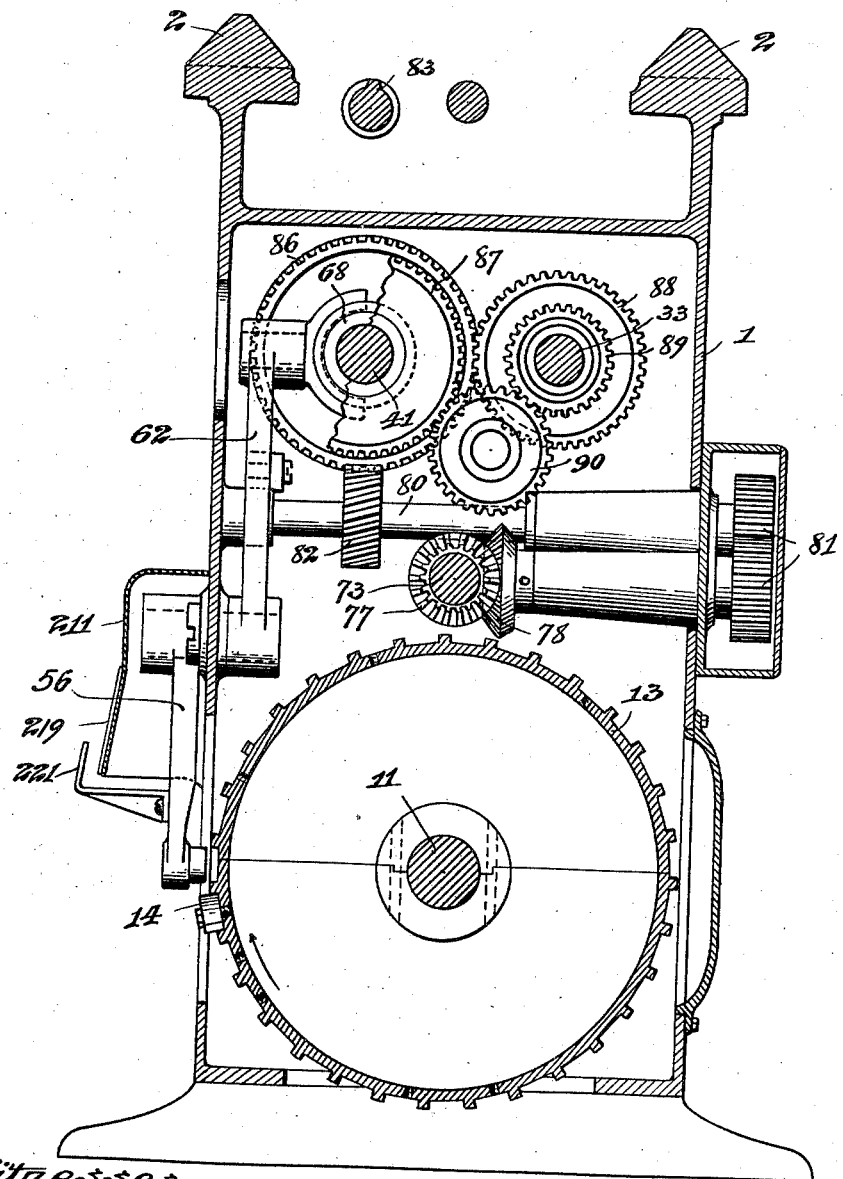

W. L. MILLER.
AUTOMATIC TURRET LATHE.
APPLICATION FILED FEB. 27, 1911.
1,081,396.
Patented Dec. 16, 1913.
12 SHEETS—SHEET 1.
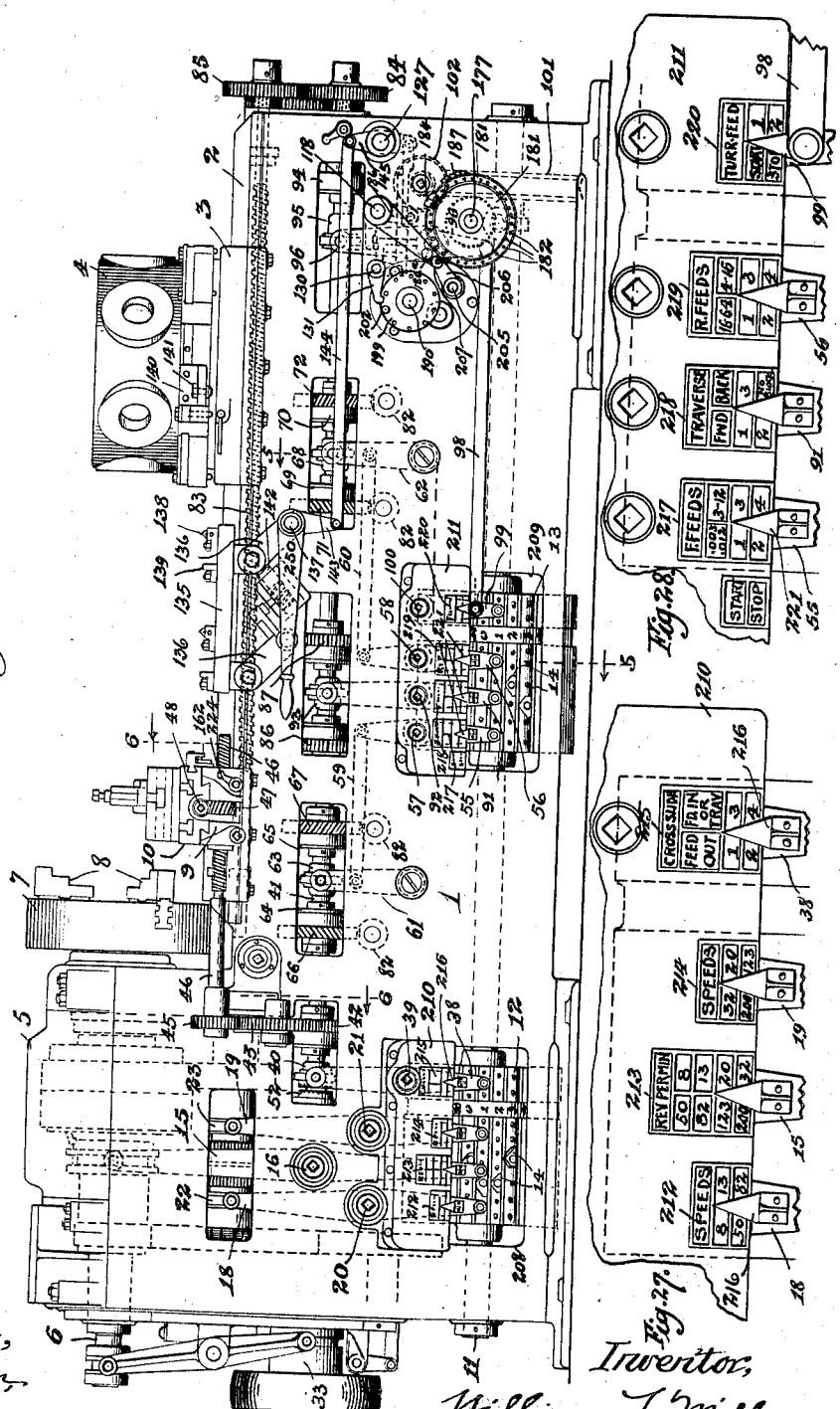

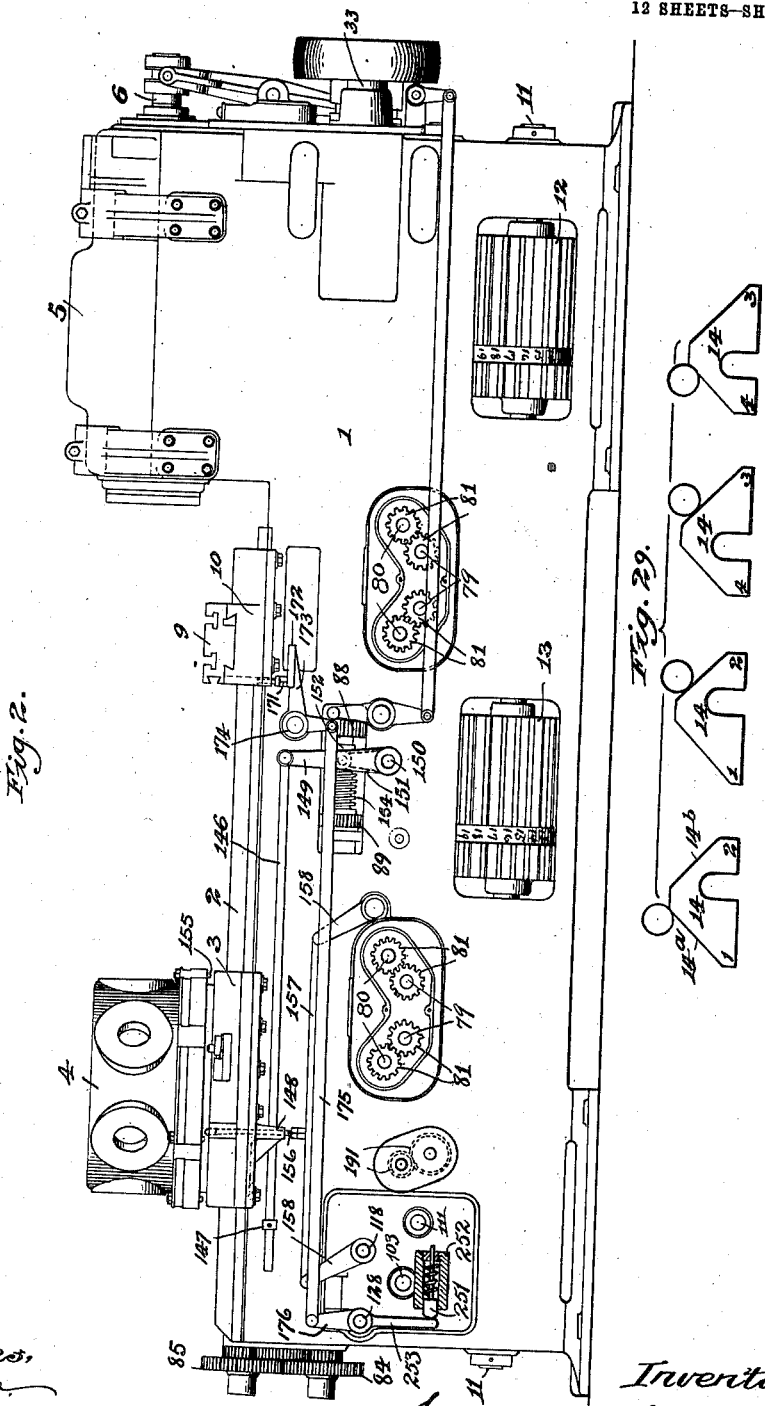

W. L. MILLER.
AUTOMATIC TURRET LATHE.
APPLICATION FILED FEB. 27, 1911.
1,081,396.
Patented Dec. 16, 1913.
12 SHEETS—SHEET 3.
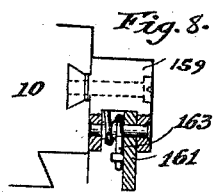
Fig. 8.
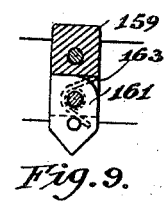
Fig. 9.
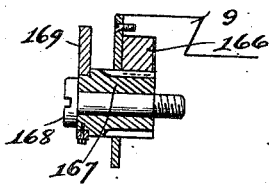
Fig. 10.
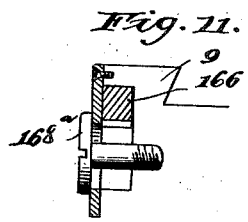
Fig. 11.
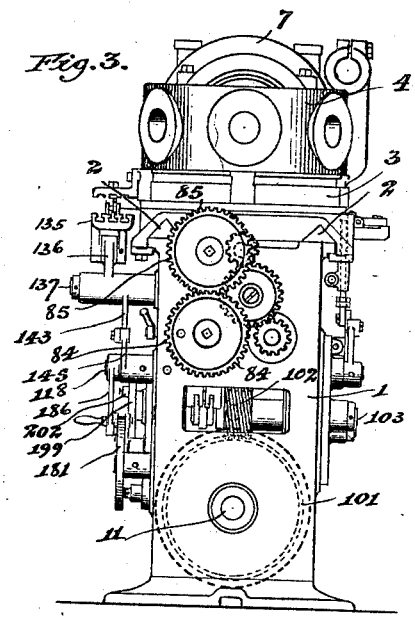
Fig. 3.
Fig. 4.
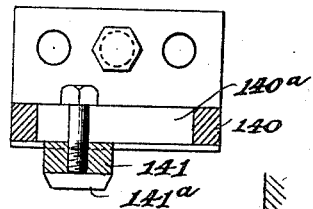
Fig. 31.
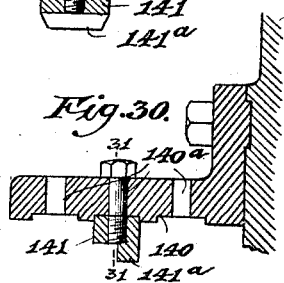
Fig. 30.
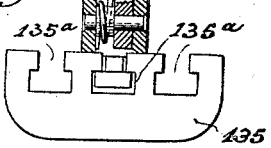
Fig. 33.
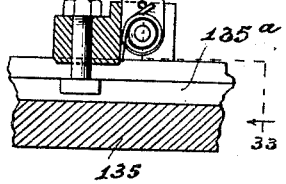
Fig. 32.
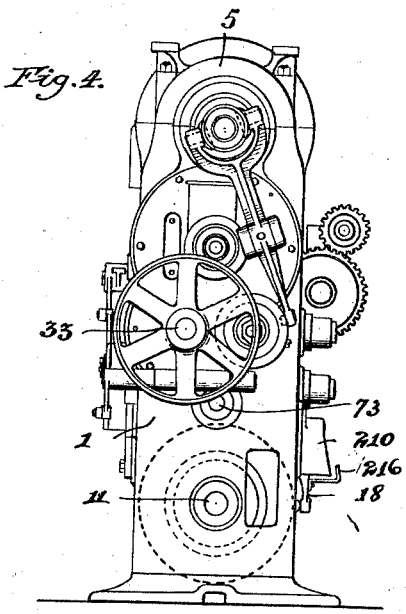
Witnesses,
Inventor,
William L. Miller
By Offield, Towle, Graves & Offield
Attys.

W. L. MILLER.
AUTOMATIC TURRET LATHE.
APPLICATION FILED FEB. 27, 1911.

1,081,396.

Patented Dec. 16, 1913.
12 SHEETS—SHEET 4.

W. L. MILLER.
AUTOMATIC TURRET LATHE.
APPLICATION FILED FEB. 27, 1911.
1,081,396.
Patented Dec. 16, 1913.
12 SHEETS—SHEET 5.
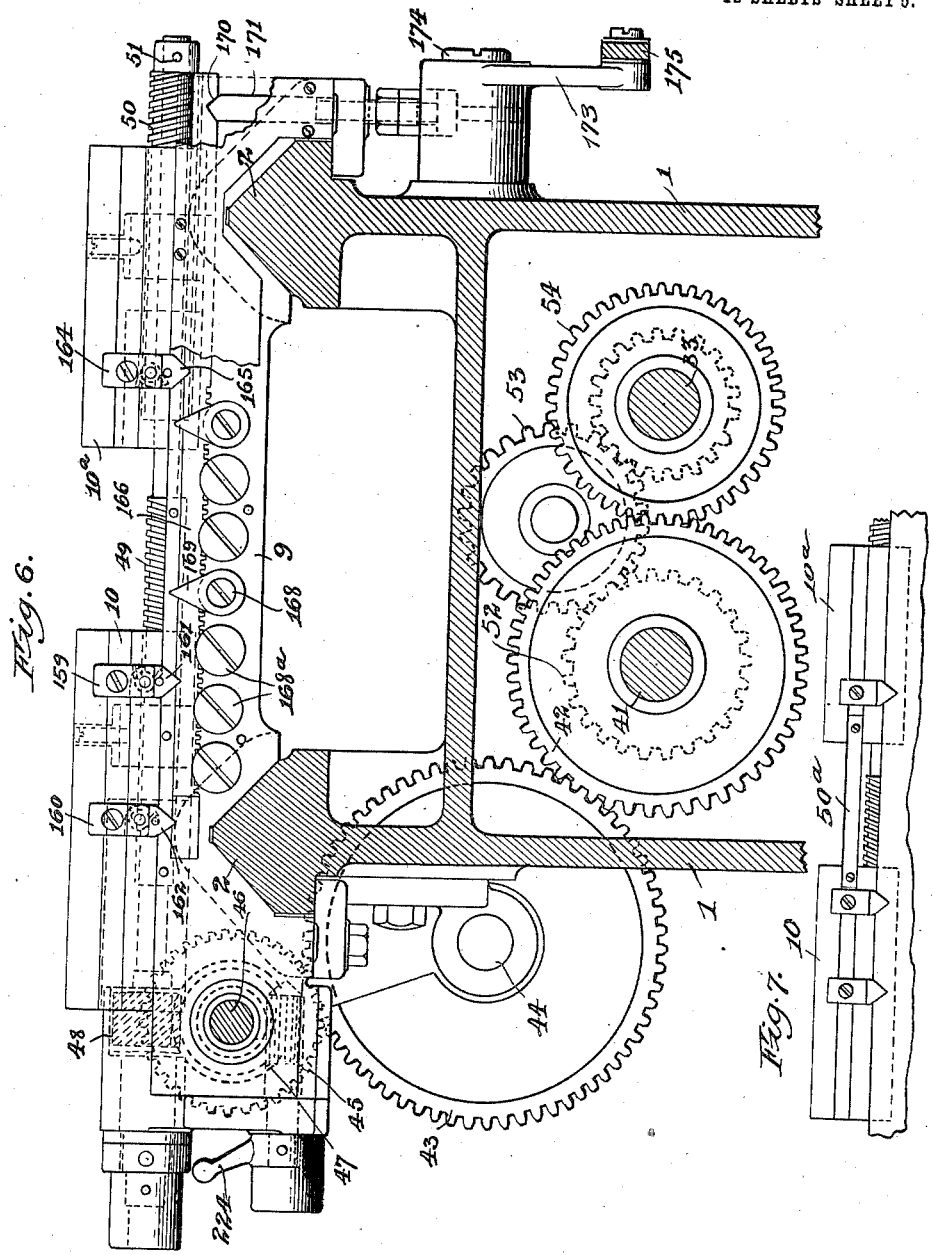

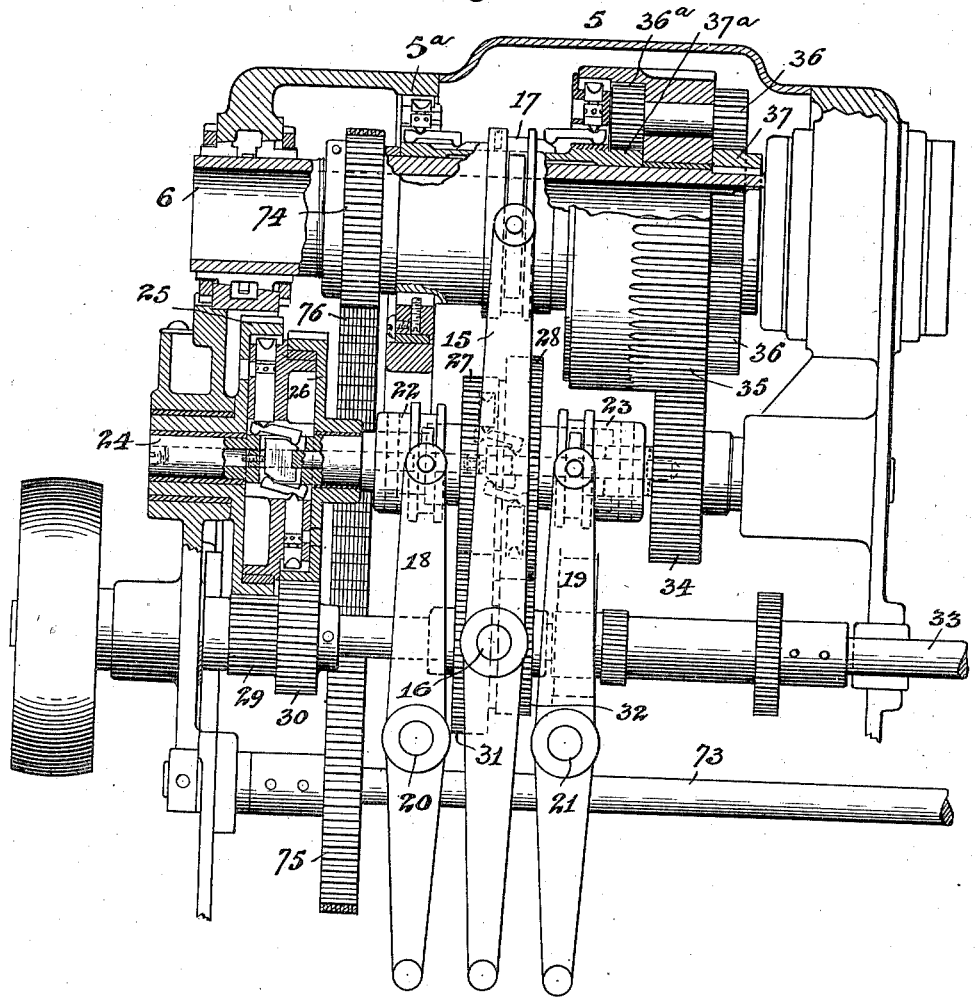

W. L. MILLER.
AUTOMATIC TURRET LATHE.
APPLICATION FILED FEB. 27, 1911.
1,081,396.
Patented Dec. 16, 1913.
12 SHEETS—SHEET 7.
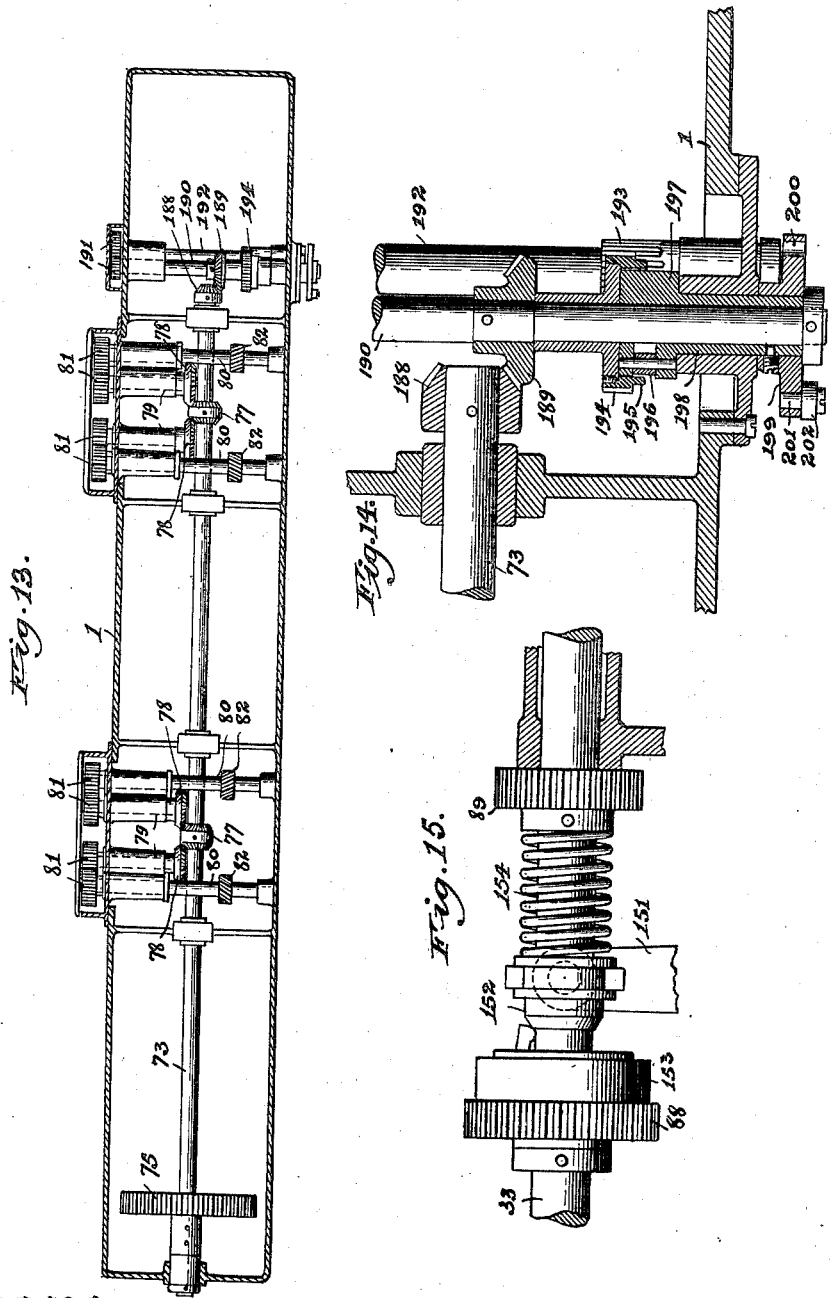

W. L. MILLER.
AUTOMATIC TURRET LATHE.
APPLICATION FILED FEB. 27, 1911.

1,081,396.

Patented Dec. 16, 1913.
12 SHEETS—SHEET 8.

W. L. MILLER.
AUTOMATIC TURRET LATHE.
APPLICATION FILED FEB. 27, 1911.
1,081,396.
Patented Dec. 16, 1913.
12 SHEETS—SHEET 9.
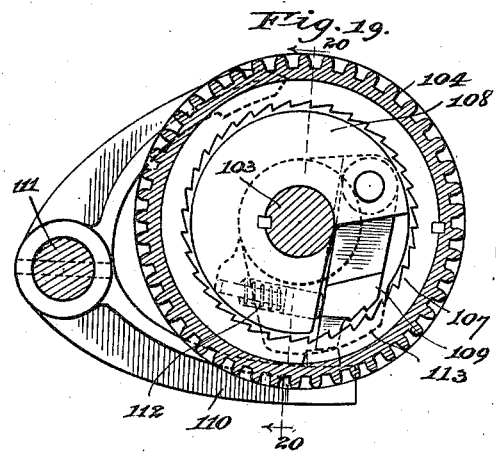
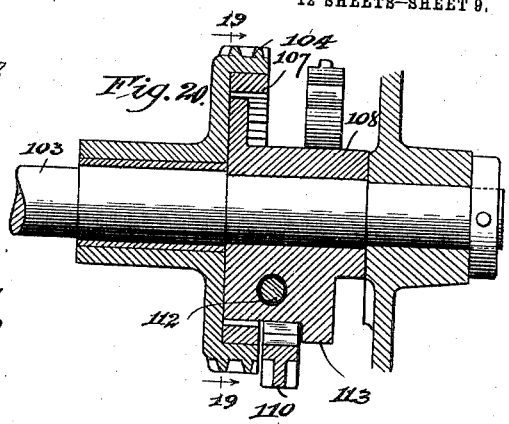
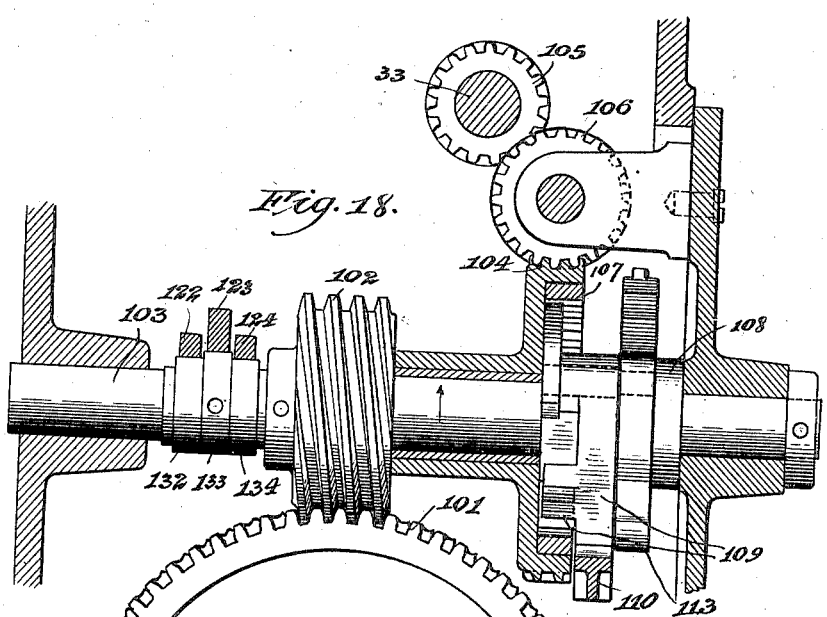
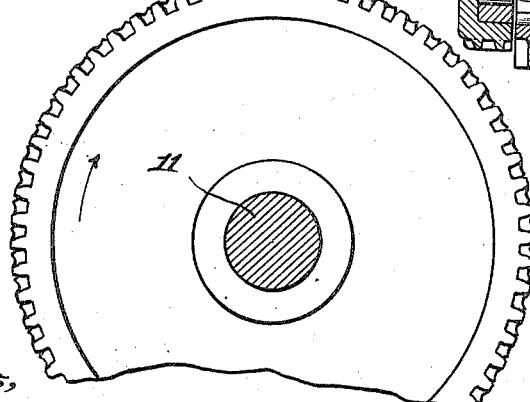

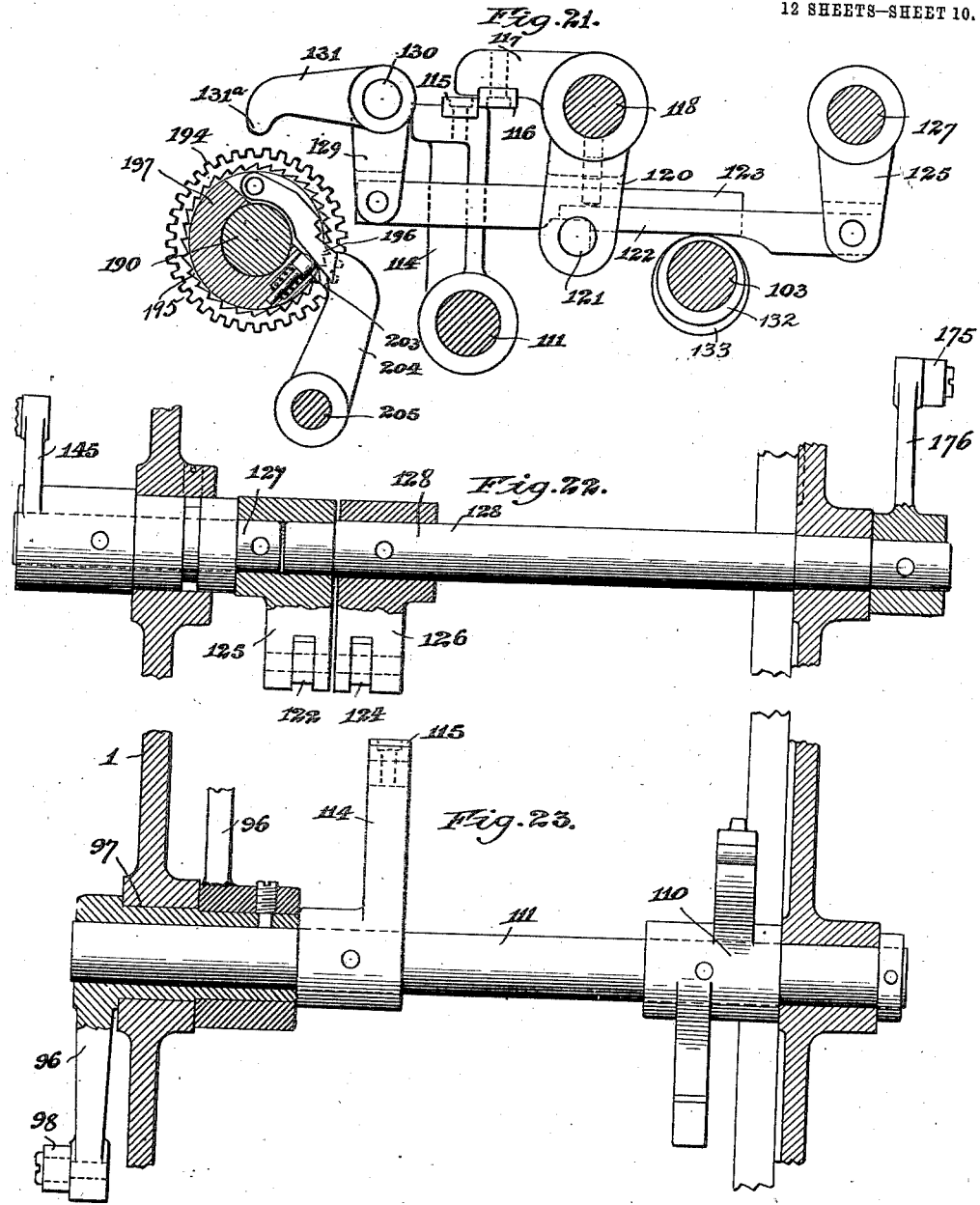

W. L. MILLER.
AUTOMATIC TURRET LATHE.
APPLICATION FILED FEB. 27, 1911.
1,081,396.
Patented Dec. 16, 1913.
12 SHEETS—SHEET 11.
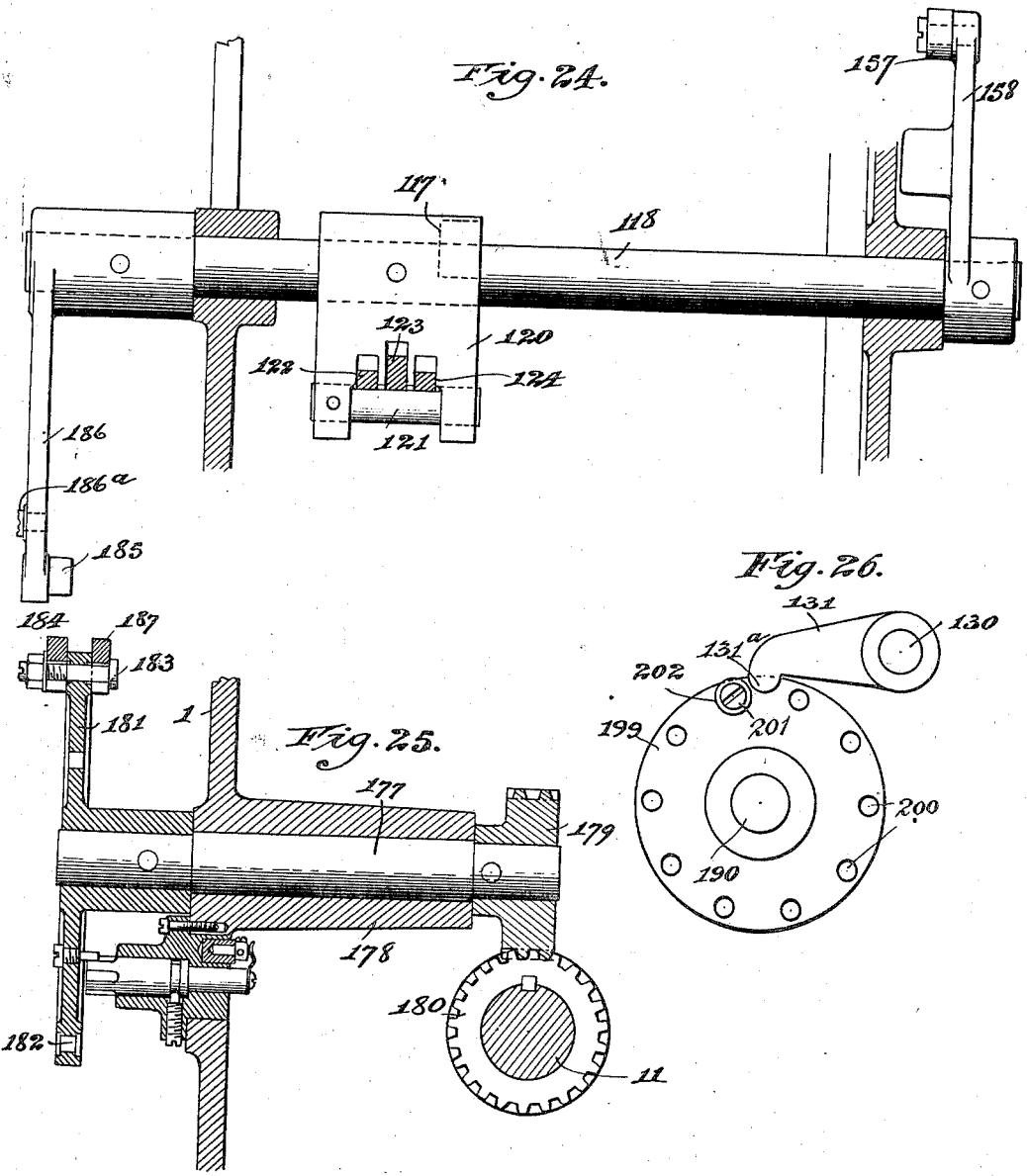

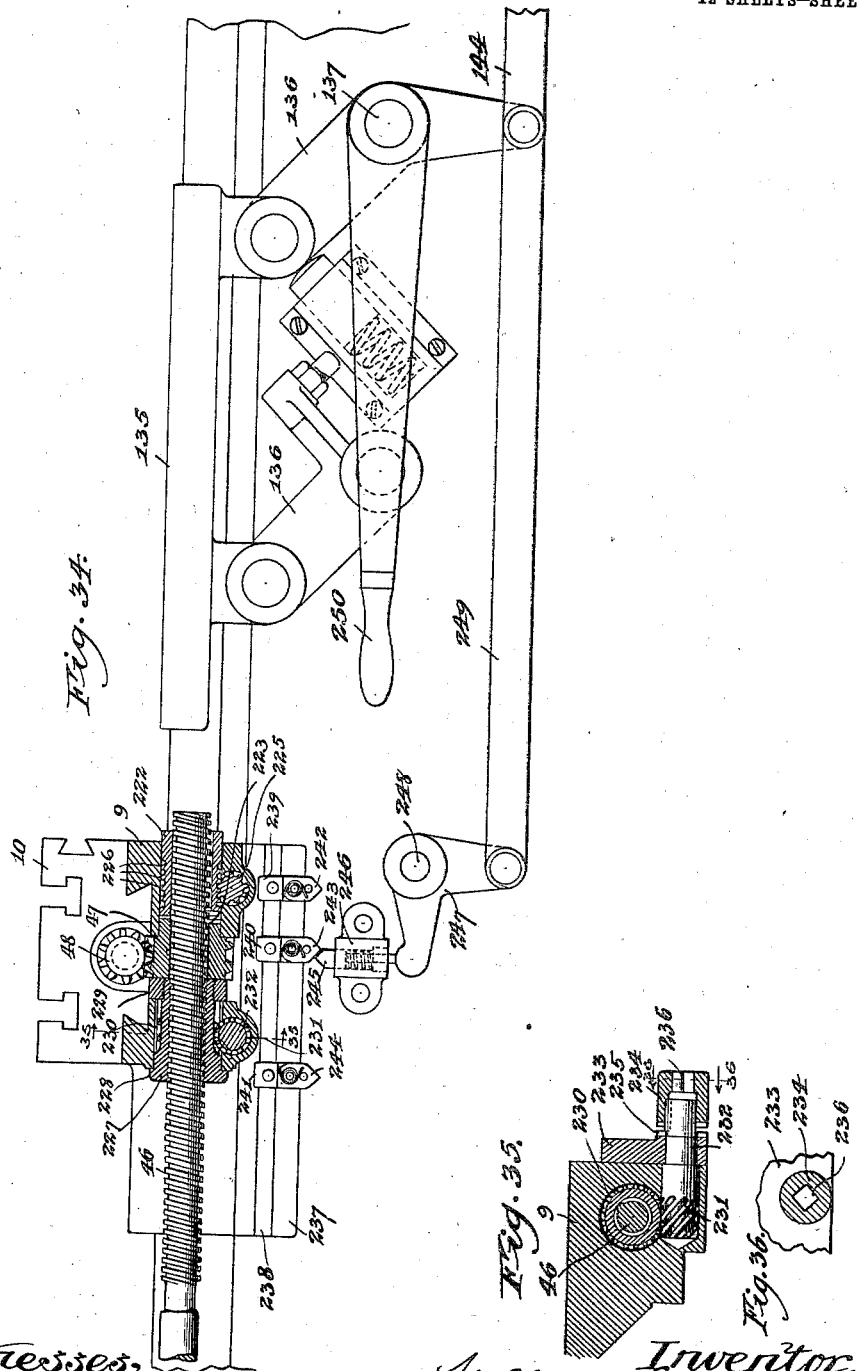

UNITED STATES PATENT OFFICE.

WILLIAM L. MILLER, OF MADISON, WISCONSIN, ASSIGNOR TO GISHOLT MACHINE COMPANY, OF MADISON, WISCONSIN, A CORPORATION OF WISCONSIN.

AUTOMATIC TURRET-LATHE.

1,081,396.

Specification of Letters Patent. Patented Dec. 16, 1913.

Application filed February 27, 1911. Serial No. 611,037.

*To all whom it may concern:*

Be it known that I, WILLIAM L. MILLER, a citizen of the United States, residing at Madison, in the county of Dane and State of Wisconsin, have invented certain new and useful Improvements in Automatic Turret-Lathes, of which the following is a specification.

This invention relates to metal working machines of the automatic turret lathe type, and has for its general object to provide a machine capable of effecting a wide variety of operations upon the work, and wherein the machine can be so set or primed that the several operations will automatically be performed in proper succession, without requiring the use of variously formed cams, and without requiring attention on the part of the operator beyond the original setting or priming of the machine for a given job and the removal of the finished work and the substitution of a new blank or a new portion of a bar as each piece of work is finished.

The machine of my present invention comprises as its chief and most distinctive feature a novel means for effecting the automatic control of the principal operating parts of the lathe, including the spindle, the turret, and the cross-slide where the latter is used; such controlling means effecting automatic variations in the speed of rotation of the spindle through the back gear and headstock mechanism; the rapid or quick traverse movements of the turret and cross-slide, and the reversal of such movements; the changes from the quick traverse to the feed movements of the turret and cross-slide, and the variations in rate of such feed movements; and all the various changes and reversals which are required in the several work-carrying and work-engaging mechanisms of the machine. In its preferred embodiment herein illustrated, said controlling means takes the form of a pair of intermittently moving drums, each of which is capable of having applied thereto, in various positions thereon, cam-blocks which in turn, as the drums are rotated, engage the lower ends of certain levers, the upper ends of the latter being suitably connected to the several mechanisms through which the changes of speed and direction of movement of the operating parts that engage the work are effected. The shaft on which these drums are mounted is connected with the pulley or main driving-shaft of the machine through driving connections which are normally idle, but are adapted to be rendered active by certain trip devices automatically thrown into operation to move or index the drums around one or more steps by trips or projections carried by the several moving parts or members that are controlled as to their speed and direction of movement by the said intermittently moving cam-drums. By such mechanism, the operator, knowing in advance the various operations to be performed upon a given piece of work, the tools to be used, the proper feeds to be given to each tool, and the proper spindle speeds, sets the cams on the drums accordingly to produce automatically the predetermined movements and speeds; places the work in the chuck; and applies the power to the main or pulley shaft. The machine thereupon automatically performs these several operations in proper order or succession, and automatically stops when the same are completed, leaving it to the operator only to remove the finished work and insert in the chuck a new piece of work.

In the accompanying drawings I have illustrated one practical form in which the invention may be embodied; but it will be understood that the same may be varied considerably in respect to details within the scope of the appended claims; and referring thereto—

Figure 16:
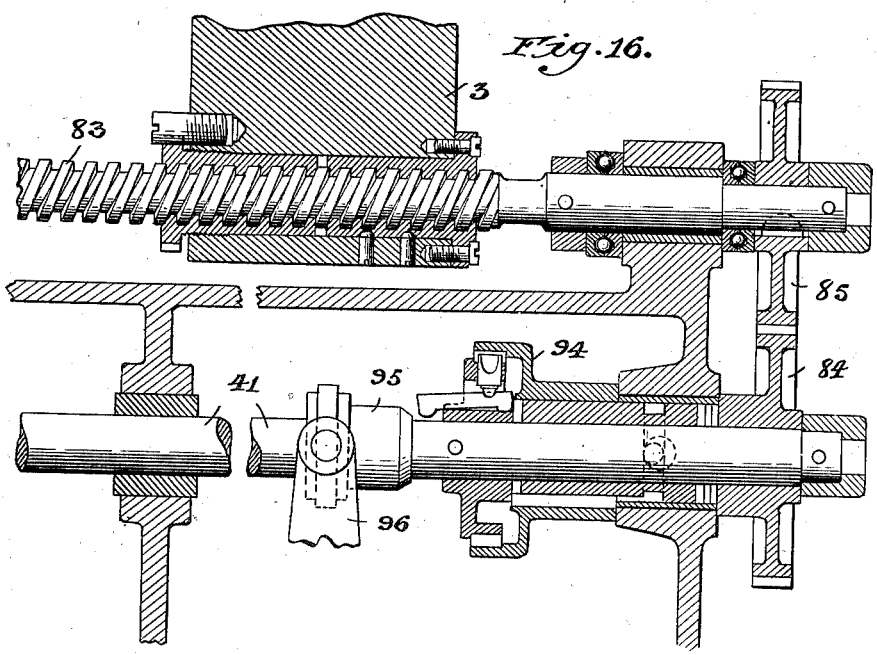
Figure 17:
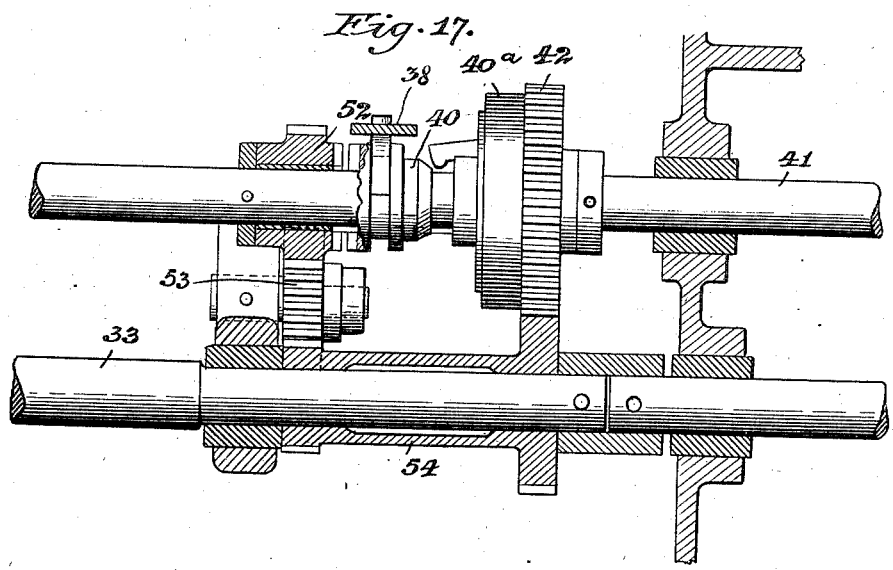

Figures 1 and 2 are side elevational views of the machine from opposite sides thereof. Figs. 3 and 4 are opposite end elevational views of the machine. Fig. 5 is an enlarged cross sectional view substantially on the offset dotted line 5—5 of Fig. 1. Fig. 6 is a partial cross-section, enlarged, on the line 6—6 of Fig. 1, with parts omitted for the sake of clearness. Fig. 7 shows in side elevation a modification of the cross-slide connection. Figs. 8 and 9 are enlarged sectional details of a tripping-dog and its holder carried by the cross-slide. Figs. 10 and 11 are enlarged sectional details of the pointer actuated by the tripping-dog of the cross-slide, the parts directly actuated thereby, and the manner of mounting the same in the cross-slide carriage. Fig. 12 is an enlarged view partly in elevation and partly in vertical section of the spindle, head-stock mechanism and back gear. Fig. 13 is a horizontal section through the machine showing in plan the change-gear mechanism for securing variations in the fine and roughing feeds. Fig. 14 is an enlarged detail in horizontal section through a part of the mechanism shown at the right of Fig. 13, and showing in part the mechanism for securing a predetermined number of spindle revolutions in order to effect a fine facing or toolmark removing operation. Fig. 15 is an enlarged detail of the mechanism for transmitting oppositely rotating movements from the pulley or drive-shaft to the intermediate shaft. Fig. 16 is an enlarged sectional detail showing the clutch-controlled transmission from the intermediate shaft to the turret-lead screw. Fig. 17 is an enlarged detail showing in part the mechanism for reversing the direction of feed of the cross-slide. Fig. 18 is an enlarged detail, partly in section, and partly in elevation, showing the normally idle power transmission from the drive-shaft to the drum-shaft. Fig. 19 is a cross-sectional detail through the normally open clutch and the yoke shaft of said power transmission between the drive-shaft and the drum-shaft. Fig. 20 is a sectional detail on the line 20—20 of Fig. 19. Fig. 21 is an enlarged detail in cross-section through parts of the drum-tripping mechanism. Figs. 22, 23, and 24 are enlarged detail elevations of certain of the shafts, their bearings, and parts carried thereby employed in the tripping mechanism. Fig. 25 is an enlarged detail in vertical section showing the index disk, the blocks carried thereby, and its gearing to the drum-shaft. Fig. 26 is an enlarged front elevational detail of the dial disk constituting a part of the mechanism for securing a predetermined number of spindle revolutions for tripping the fine feed. Figs. 27 and 28 are detail elevations of the hoods covering the drums and carrying the index-plates that coöperate with pointers on the several clutch-shifting levers. Fig. 29 is a group view showing the several positions on the drums which each cam-block may assume, according to the particular operation to be secured thereby. Fig. 30 is an enlarged sectional detail of a trip-block carried by the turret-slide. Fig. 31 is a similar view on the line 31—31 of Fig. 30. Fig. 32 is an enlarged sectional detail of a trip-block that coöperates with the trip shown in Figs. 30 and 31. Fig. 33 is a similar view on the line 33—33 of Fig. 32. Fig. 34 is an enlarged detail view partly in side elevation and partly in vertical section through the carriage slide and its actuating mechanism, showing a means for effecting either a manual or a power traverse or feed of the carriage longitudinally on the ways of the bed and for automatically tripping the power traverse or feed out of action or changing the same. Fig. 35 is a cross-sectional detail on the line 35—35 of Fig. 34. Fig. 36 is a cross-sectional detail on the line 36—36 of Fig. 35.

Referring first to Figs. 1 to 4 inclusive, 1 designates as an entirety the substantially rectangular frame or housing of the machine, surmounting which and extending the major part of the length thereof are parallel V-shaped ways 2 (Figs. 5 and 6) that support the turret-slide 3, rotatably mounted on which latter is the turret-head 4. At one end of the frame and disposed above the bed of the lathe is the head-stock mechanism designated as an entirety by 5, the same carrying a hollow spindle 6 terminating at its inner end in a chuck-head 7 in which are mounted to slide radially the usual chuck-jaws 8. Slidably mounted on a carriage 9, which, in turn, is itself slidable sidewise on the main ways 2 of the bed, is a cross-slide 10 having the functions of the usual tool-carrying cross-slide that moves toward and from the work in a direction at right angles to the bodily movement of the turret 4. Extending lengthwise and substantially centrally of the lower portion of the housing and suitably journaled in or near the end walls thereof is a drum-shaft 11 (Fig. 5), keyed or otherwise secured on which are a pair of intermittently moving drums 12 and 13. These drums as herein shown are duplicates in structure for convenience in manufacturing, and, as best shown in Fig. 5, each is provided on its surface with a series of longitudinal channels, herein shown as 31 in number, which are adapted to receive and support detachable and reversible cam-blocks 14, shown in detail in Fig. 29. These cam-blocks are designed, as their respective drums are turned, to engage the lower ends of certain levers which throw into and out of action, and control the speeds or rates of feed of, various operating parts of the machine; and each of these cam-blocks is formed with a relatively long inclined face 14$^a$ and a shorter inclined face 14$^b$; and each block is reversible as to its position on the drum so that it can engage the lower end of a lever on either side and by either its long or its short face, thus making four positive positions of each cam-block on the drum relatively to the lever which it controls, these four positions being illustrated in Fig. 29. The function of the longer side of the block is to shift the lever from one working position to the other working position or from a central idle position to either working position; while the function of the short side is to shift the lever from working position to the central idle position. The cam-blocks of each drum actuate four levers, the lower ends of which depend in positions to be engaged and actuated by said blocks as the drums are indexed. The levers controlled by the drum 12 comprise a lever 15 pivoted at 16 and at its upper end engaging a clutch follower 17 (Fig. 12) slidably mounted on a sleeve-gear 37ª surrounding the spindle 6 and controlling the driving of the latter either directly or through a planetary gear for effecting a doubling of the number of spindle speeds. On either side of the lever 15 are levers 18 and 19 pivoted at 20 and 21, respectively; the upper ends of said levers engaging sleeves 22 and 23, respectively, (Fig. 12) slidably mounted on a back-gear shaft 24, said sleeves being connected to and operating expansion-ring clutches within four spur-gears 25, 26, 27, and 28 loose on shaft 24, the latter being driven by four pinions 29, 30, 31, and 32, respectively, keyed to the main pulley shaft 33 of the machine. The back-gear-shaft 24 carries a fixed gear 34 that engages a large gear 35 running loosely on the spindle 6 and carrying planetary gears 36 which engage a fixed gear 37 on the spindle 6. On the other ends of the shafts of the planetary pinions 36 are pinions 36ª meshing into the sleeve gear 37ª loose on spindle 6 and having expansion ring clutch connections at its opposite ends engaging with the large gear 35 or with a fixed bearing 5ª of the casing. When the clutch-follower 17 is moved to the right, the sleeve gear 37ª and the large gear 35 are locked together by the clutch so that there can be no rotation of the pinions 36ª and 36 on their own axes, and consequently the gear 37 and spindle 6 are driven at the same rate of speed as the large gear 35. When, however, the clutch-follower 17 is shifted to the left, sleeve-gear 37ª is locked to the frame, so that the pinions 36ª and 36 revolve on their own axes as the large gear 35 is turned; and, as the ratio of pinions 36ª and sleeve gear 37ª differs from that of pinions 36 and gear 37, the spindle 6 is driven at a decreased speed relatively to the speed of gear 35, the ratio in the case shown being one to six and a quarter. By this mechanism any one of four different speeds can be imparted to the back gear shaft 24, through the manipulation of the levers 18 and 19; and through the planetary gear, each one of these four speeds can be varied by the ratio afforded by the planetary gear; thus providing for eight different spindle speeds by suitable manipulation of the levers 15, 18, and 19. The fourth lever 38, controlled by the drum 12, itself controls the inward and outward traverse and feed movements of the cross-slide 10 in connection with mechanism controlled by drum 13. Lever 38 is pivoted at 39, and its upper end engages a clutch-follower 40 (Figs. 1 and 17) on an intermediate shaft 41 that extends lengthwise of the machine-bed, its relative position being shown in the cross-sectional views Figs. 5 and 6. Clutch-follower 40, through an expansion-ring clutch 40ª, places in driven relation to the shaft 41 a spur-gear 42 that, through an idler spur-gear 43 (Figs. 1 and 6) journaled on a stub-shaft 44, drives, through a gear 45, a shaft 46, on which latter is a spiral gear 47 driving a mating spiral gear 48 on the cross-feed screw 49 (Fig. 6) of the cross-slide 10. In Fig. 6 I have also shown a rear cross-slide 10ª adapted to be given a simultaneous and opposite movement to the slide 10 by an oppositely threaded feed-screw 50 sleeved upon a smooth portion of the main feed-screw 49 and keyed thereto by a pin 51. Obviously, should it be desired to operate both slides simultaneously in the same direction, the threaded sleeve 50 can be omitted or pin 51 removed and the two slides strapped together by means of a suitable binding strip 50ª, as shown in Fig. 7. By means of certain of the levers controlled by drum 13, any one of four different feeds can be imparted to the intermediate shaft 41, and consequently to the cross-slide; and each of these feeds can be independently varied as desired, by manually manipulating certain change-gears through which the intermediate shaft 41 is driven from the feed-shaft 73, as hereinafter described. An outward feed movement of the cross-slide 10 or inward feed movement of cross-slide 10ª when strapped to slide 10 is obtained by shifting the upper part of lever 38 to the left of its position as shown in Figs. 1 and 17, so that the opposite toothed face of clutch-follower 40, which is keyed to the shaft 41, engages with a clutch-gear 52, which latter then drives the gear 42 in the opposite direction through idler gear 53 and sleeve gear 54 (Fig. 17) loose on pulley-shaft 33.

Referring next to the levers controlled by drum 13, two of these levers designated by 55 and 56 are pivoted at 57 and 58, respectively, and at their upper ends have link connections 59 and 60, respectively, with clutch-shifting levers 61 and 62, respectively. The lever 61 operates a double-faced clutch follower 63 on the intermediate shaft 41 and operating expansion-ring clutches 64 and 65, by which worm-wheels 66 and 67 are made fast with shaft 41; and the lever 62 similarly actuates a double-faced clutch-follower 68 in turn operating expansion-ring clutches 69 and 70 by which worm-wheels 71 and 72 may be made fast with shaft 41. The several worm-wheels 66, 67, 71 and 72 are all constantly driven at different rates of speed from the feed-shaft 73 (Figs. 5, 12, and 13), said feed-shaft 73 being, in turn, driven from the spindle 6 by gears 74 and 75 on the spindle 6 and shaft 73, respectively, and a connecting link-belt 76 (Fig. 12). The feed-shaft 73 carries double-faced bevel gears 77 (Figs.

5 and 13) driving bevel gears 78 on shafts 79, which latter drive parallel shafts 80 through change-gears 81 on the back of the bed, independent change-gears being provided for each of the feeds provided on the machine. The shafts 80 carry worms 82 meshing with the several worm-wheels 66, 67, 71 and 72 and in varying ratios to the latter, said worm-wheels normally running loose on the intermediate shaft 41; and the change-gear mechanism last described serves to provide a considerable range for each of the four feeds for both the cross-slide and the turret. The intermediate shaft 41 is geared to the turret lead-screw 83 by spur-gears 84 and 85 (Figs. 1 and 16) on said intermediate shaft and lead screw, respectively; the spur-gear 84 on the intermediate shaft having a clutch-controlled connection with the latter, as hereinafter explained. The rapid back and forward traverse of the turret and cross-slide is provided for by means of a pair of oppositely driven spur-gears 86 and 87, respectively, that are loose on the intermediate shaft 41 and are driven in opposite directions at a constant speed from the main pulley-shaft 33. Said pulley-shaft 33 has loose thereon a clutch-controlled gear 88 (Figs. 2, 5 and 15) meshing directly with the back traverse gear 86 and a fixed gear 89 driving the forward traverse gear 87 through an idler gear 90. These rapid traverse gears 86 and 87 are thrown into driving engagement with the intermediate shaft 41 by a lever 91 pivoted at 92, its upper end engaging a double-ended clutch-follower 93 on the shaft 41 and operating expansion ring clutches within the gears 86 and 87, and its lower end adapted to be shifted by suitable cam-blocks on the drum 13. For throwing the turret-slide into and out of action, the hub of the gear 84 has fast therewith one member of an expansion ring clutch 94 (Fig. 16) that is actuated by a clutch follower 95 slidably mounted on the intermediate shaft 41; and connected with said clutch-follower is the upper end of a lever 96 suitably pivoted to the frame at 97 (Fig. 23), the lower end of said lever being connected by a link 98 with a lever 99, pivoted at 100, the lower end of said lever 99 lying opposite the drum 13 and adapted to be shifted by suitably placed cam-blocks, whereby the rotation of the lead-screw of the turret may be automatically started and stopped at the desired times.

Describing next the mechanism for effecting the intermittent revolving movements or indexing of the drums 12 and 13, and referring more particularly to Figs. 18 to 20, 101 designates a worm-wheel fast on the drum-shaft 11 driven by a worm 102 keyed to a cross-shaft 103 suitably journaled between the side walls of the frame or housing. Loose on the shaft 103 is a spiral gear 104 that is constantly driven from the main pulley shaft 33 by spiral gears 105 and 106. The spiral gear 104 carries a steel ratchet 107 with internal notches, as shown in Fig. 19; and keyed to the worm-shaft 103 is a dog-holder 108 which carries a pivoted dog 109, the teeth of which are normally held out of engagement with the ratchet-ring 107 by the lower arm of a yoke-lever 110 which engages the nose of the dog, raising it sufficiently to keep its teeth out of engagement with the ratchet-ring. The yoke-lever 110 is fast on a cross-shaft 111 mounted parallel with the worm-shaft 103. When, however, by mechanism hereinafter described, the yoke-lever 110 is tripped so as to allow it to fall, the dog 109 is thrown into engagement with the ratchet-ring by a spring-pin 112 (Fig. 19) slidably mounted in the dog-holder 108; and when this occurs the worm-shaft 103 is caused to make one revolution thereby indexing or advancing the drum-shaft and drums one space. This drum-indexing movement is limited to a single space (except when the drums are indexed through several spaces by a single continuous movement of the drum-indexing mechanism as hereinafter explained) by a mechanism which automatically raises the yoke-lever 110 at the completion of a single revolution of the worm-shaft 103 and restores it to a position in which its lower arm engages the dog and disconnects it from the ratchet-ring. This mechanism consists of a cam 113 carried by the dog-holder 108 that, as the dog-holder rotates, engages and lifts the upper arm of the yoke-lever 110 and thereby throws into action a catch mechanism that normally holds the yoke-lever in raised position. This catch mechanism, in the form herein shown, (see Figs. 21, 23 and 24) comprises the following parts: 114 designates an arm fast on and upstanding from the yoke-shaft 111 and carrying at its upper end a hardened steel block 115 that normally abuts against a corresponding block 116 carried by a horizontal arm 117 fast on another cross-shaft 118. Keyed to and depending from the shaft 118 is a relatively wide arm 120 (Fig. 24), the lower end of which is forked and carries a pin 121 which is flattened on two sides and constitutes a support for the free ends of three flat rods 122, 123, and 124, which rods are notched or shouldered on their under sides to engage the vertical flat face of the pin 121 so as to swing the arm 120 and thus rock the shaft 118 under certain longitudinal movements of the rods 122, 123, and 124. The rods 122 and 124 are pivoted at their other ends to depending arms 125 and 126, respectively, carried by alined but independent shafts 127 and 128, respectively (Fig. 22), mounted in the side walls of the frame or housing (Fig. 1); and the intermediate rod 123 is pivotally connected to a depending arm 129 (Fig. 21), fast on a stub-shaft 130, from which latter, outside the casing, projects a horizontal arm 131 terminating in a down-turned nose 131ª for a purpose hereinafter described. All three of the arms 122, 123, and 124 extend above and across the worm-shaft 103, and the latter is provided with a series of eccentrics 132, 133, and 134, which operate to raise the respective rods 122, 123, and 124 at the proper times to disengage their shouldered portions from the pin 121, and thus allow the catch-block 116 to drop into stop engagement with the catch-black 115 as shown in Fig. 21.

From the foregoing it will be seen that the rods 122, 123, and 124, when given a longitudinal movement during their shouldered engagement with the pin 121, separate the catch-blocks 116 and 115, thus allowing the yoke 110 to drop away from the dog 109 and causing an indexing movement of the drum-shaft and drums which is continued until the dog is again thrown out of engagement with the ratchet-ring 107 by the engagement of the cam 113 with the upper arm of the yoke and the locking of the yoke in its raised position by the coöperating catch-blocks 116 and 115. The means whereby these trip rods 122, 123, and 124 are thus actuated from the turret and cross-slide will next be described.

Referring to Figs. 1, 3, and 30 to 33, 135 designates a table mounted on oscillating links 136 pivoted on studs 137 projecting from the side wall of the casing; the upper surface of the said table being provided with a plurality of parallel slots 135ª for the adjustable mounting therein of trip-blocks 138 and 139. The turret-head is provided beneath each of the flat tool-carrying faces with a laterally projecting bracket 140 formed with parallel slots 140ª in one of which is mounted a block 141 having a tapered lower end 141ª adapted to engage the tapered upper ends of the blocks 138 and 139, thereby depressing the table 135 in opposition to a spring-actuated pin 142 which normally maintains the table 135 in raised position. The hub of the rear link 136 has a depending arm 143 which is connected by a link 144 with an arm 145 (Fig. 22) fast on the shaft 127; pinned to and depending from which latter shaft is the arm 125 carrying the trip-rod 122. Blocks 138 and 139 are set on the table 135 at positions corresponding with those at which it is desired to arrest the forward rapid traverse movement of the turret-slide and throw in a feed movement, and arrest the latter and throw in the back traverse. In operation, the turret-slide feeds forward under its rapid traverse movement until the block 141 engages the beveled top of the stop-block 138, which depresses the table and causes the trip mechanism for indexing the drum 13 to operate through the described connections, whereby, by cam-blocks suitably placed on the drum 13, the quick traverse motion is arrested and the proper feed engaged by one of the levers 55 and 56. The turret-slide continues then to feed forward until block 141 comes in contact with block 139, whereupon, when the indexing mechanism is again tripped, by suitably placed cam-blocks on the drum 13, the feed is disengaged and the back traverse motion is engaged. The block 138 is pivoted and spring-actuated to normal position, as shown in Figs. 32 and 33, so as to yield when struck by the block 141 during the back traverse movement of the turret-slide without depressing the table 135, but block 139 may be rigid, if desired. Hence, it will be seen that the first described mechanism (block 138) trips the drum-indexing devices on the forward motion of the turret-slide only.

The back traverse movement of the turret-slide is arrested and its return or forward movement started by means of an automatic device for disconnecting the drive between the pulley-shaft 33 and the intermediate shaft 41, and a subsequent automatic reversal of the direction of rotation of the intermediate shaft. This automatic mechanism for arresting the backward travel is best shown in Figs. 2, 5, and 15, and comprises a rod 146 (Fig. 2) on the back side of, and parallel with, the bed, carrying an adjustable collar 147 which, when the turret traverses back at a high rate of speed, is struck by a lug 148 depending from the turret-slide 3. The opposite end of rod 146 is connected to an arm 149 fast on a cross-shaft 150, this latter also having fast thereon an upstanding arm 151 (Fig. 15) which at its upper end engages a clutch-follower 152 on the pulley-shaft 33, which clutch-follower 152 normally maintains the gear 88 fast with the pulley-shaft through an expansion-ring clutch 153; the clutch-follower 152 being forced into the expansion-ring clutch by a strong spring 154 encircling the pulley-shaft 33 between the clutch-follower 152 and the fixed gear 89. The engagement of the lug 148 with the collar 147, through the described connections, retracts the clutch follower 152 from the expansion clutch 153 and thereby arrests the drive of the intermediate shaft 41. Now, as the turret-slide 3 travels back, the turret-rotating mechanism (not herein shown and described) causes the turret-head to turn to present a new face to the work; and during such turning movement a pin 155 carried by the turret-head (one for each face thereof) overrides the upper end of a depressible pin 156 slidably mounted in the turret-slide 3 (Fig. 2), the lower end of said pin 150 depressing a horizontal bar 157 that is pivoted at its ends on the upper ends of a pair of arms 158; one of said arms 158 being fast on the shaft 118 (Figs. 2 and 24). Hence, when shaft 118 is thus rocked, the catch-block 116 is raised out of engagement with catch-block 115, the yoke 110 is thereby allowed to drop, the dog 109 is thereby thrown into engagement with the ratchet 107, and the drums 12 and 13 are indexed through one space. By means of a suitably placed cam-block on drum 13, the lever 91 is shifted so as to unclutch the gear 86 and clutch the oppositely rotating gear 87 to the intermediate shaft, thereby driving the latter in the opposite direction from the pulley-shaft through gears 89, 90, and 87, thus starting the turret-slide on its forward traverse movement. As the lug 148 travels away from the collar 147, the spring 154 returns the clutch-follower 152 into operative engagement with the expanding-ring clutch 153, thereby reëstablishing the driven engagement of the gear 88 with the pulley-shaft 33. As the gear 86 on the intermediate shaft (with which the gear 88 meshes) has, however, by this time been freed from driving engagement with the intermediate shaft by the shifting of the clutch-follower 93 into engagement with the clutch of gear 87, the turret-slide continues to travel forward until its rapid traverse has been stopped and its feed movement started by the engagement of the block 141 with the block 138, as previously described. In this connection it may be stated that the lever 99 actuated by a cam-block on drum 13 and connected to the clutch 94 is employed only when it is desired to intermit or throw out the use of the turret-slide, and use the cross-slide alone.

Referring next to the tripping mechanism which controls the rapid traverse and feed movements of the cross-slides 10 and 10ª, and referring more particularly to Figs. 2 and 6, to 11, on the side of the cross-slide 10 are secured a pair of holders 159 and 160 in which are pivotally mounted a pair of dogs 161 and 162; the dogs being so shaped and controlled by springs 163 that they will trip in one direction only. On the side of the carriage 10ª is mounted a similar holder 164 carrying a similar dog 165 adapted to trip in one direction only. Slidably mounted in the slide-holder or carriage 9 is a horizontal rack-bar 166 engaged by a series of sleeve-pinions 167 (Fig. 10) carried by corresponding shafts 168, tapped into the side of the carriage 9; and on the outer ends of the sleeve-pinions 167 are keyed upwardly extending pointers 169. To protect the unused holes or spaces in the side of the carriage from the ingress of dirt, I apply thereto short screw-bolts 168ª (Fig. 11) having large circular heads of sufficient size to completely cover the open ends of such holes or spaces. One end of the rack-bar 166 has in its lower edge a notch 170 normally engaged by the beveled upper end of a pin 171, the lower end of said pin overlying a broad face 172 on the end of an elbow-lever 173 pivoted to the frame at 174. The depending arm of elbow-lever 173 is connected by a link 175 with an arm 176 fast on cross-shaft 128 (Fig. 22), which shaft 128, it will be remembered, has fast thereon the depending arm 126 to which is pivoted the outer end of trip-rod 124. As the cross-slide 10 moves inwardly under a rapid traverse movement, the foremost dog 161 engages a suitably set pointer 169 and, through the connections described, trips the drum indexing mechanism, thereby stopping the rapid traverse movement and throwing in one of the feeds. The cross-slide 10 then continues its feed movement until the second dog 162 engages the same or another pointer 169, whereupon the drum indexing mechanism is again tripped, changing the rate of feed or the spindle speed or throwing into operation the back traverse movement of the cross-slide. This drum-indexing mechanism, after each tripping movement, is restored to normal position by suitable spring mechanism, such as the spring-pressed pin 251 slidably mounted in a guide 252 (Fig. 2) on the back side of the machine frame and engaging a depending arm 253 fast on the shaft 123. This spring mechanism acts through shaft 128, arm 176, link 175, bell-crank 152, pin 171 and cam notch 170 (Fig. 6) to return the rack bar 166 to normal position after the same has been actuated, it being understood that the upper end of pin 171 is never, in practice, forced entirely out of the notch 170. When the cross-slide travels back, through the engagement of the dog 165, or some other suitably placed dog, with one of the pointers 169, the drum-actuating mechanism is again tripped to arrest the back traverse of the slide and set in motion the next operation. The dog-holders 159, 160 and 164 can be located, as desired, on either or both of the slides 10 and 10ª, so as to suit convenience in effecting their respective movements, accordingly as they are mounted to move simultaneously in the same or opposite directions. When the slide 10 is traversing back, the dogs 161 and 162 yield as they engage the pointers 169 without tripping the drum-actuating mechanism.

Since a given job may not require the full number of operations provided for by the spacing of the drums 12 and 13 (31 in the instance shown), I provide means whereby, after the last operation has been performed, the drums can be continuously indexed around to the zero or starting point. Referring more particularly to Figs. 1, 24, and 25, 177 designates a short shaft journaled in a boss 178 on the frame 1 and carrying at its inner end a spiral gear 179 meshing with a spiral gear 180 of the same size fast on the drum-shaft 11. Keyed on the outer end of shaft 177 is an index dial 181 having formed through its circumferential portion a series of holes 182 corresponding in number with the slots of the drums 12 and 13, and similarly numbered. By means of bolts 183, I secure to the periphery of the index dial 181 on its front face one or more blocks 184, one for each unused space of the drums. To illustrate, in case a given job required twenty operations, including changes in speed and feed, I would apply to the periphery of the index dial 181 a continuous series of blocks 184 covering that portion of the periphery from the 21st hole around, through the space represented by the 11 remaining holes, to the hole corresponding with the zero or starting point of the drums. As the index dial 181 rotates in unison with the drum-shaft 11, making one complete rotation during one rotation of said drum-shaft (for which purpose it might be mounted directly on the latter), as soon as the last operation has been performed upon the piece of work in the lathe, the first one of the series of blocks 184 engages a roller 185 carried by the free end of an arm 186 that is fast on the shaft 118. As the arm 186 is raised by the blocks 184, the shaft 118 is rocked, disengaging the catch-block 116 from the catch-block 115, and thus allowing the drum-indexing mechanism to rotate continuously until the roller 185 passes off the last block 184, by which time the drums will have been brought around to the zero or starting point. A handle 186ª on arm 186 enables the operator to manually set in operation the tripping mechanism when desired.

In connection with, and controlled by blocks 187 bolted on the peripheral portion of the rear face of the index dial 181, I employ a mechanism which is brought into play whenever it is desired to arrest a feed after the chuck-spindle has revolved a predetermined number of times, (determined by the change-gears 191 hereinafter referred to). Referring to Figs. 1, 14 and 26, on one end of the feed shaft 73 is a bevel gear 188 that meshes with a bevel gear 189 fast on a cross-shaft 190; this latter being drivingly connected through change gears 191 on the rear of the bed with a parallel cross-shaft 192, which latter carries a gear 193 meshing with a clutch-gear 194 running loose on shaft 190. Clutch-gear 194 has an internal ratchet 195 (Figs. 14 and 21) adapted to be engaged by a dog 196 pivoted in a dog-holder 197 that is formed integral with a sleeve 198 loosely surrounding the shaft 190; and pinned to the outer end of sleeve 198 is a dial disk 199 provided in its peripheral portion with a series of holes 200, in any one of which may be mounted a stud 201 carrying a roller 202. The dog 196 is normally urged into engagement with the internal ratchet 195 by a spring-pin 203 slidably mounted in the dog-holder 197; and the dog is normally held out of driving relation to the ratchet-ring by an arm 204 fast on a stub-shaft 205 that projects through the wall of the casing and carries on its outer end another arm 206 (Fig. 1) carrying at its free end a roller 207 that normally rests upon the series of blocks 187 on the rear face of the dial. Since it is impracticable to set two trip-blocks so close together on table 135 as to trip out a fine feed after using a coarse feed, one or more of the blocks 187 is removed from the dial 181 at the proper place, and one or more rollers 202 is set in one or more of the holes 200 of the disk 199, according to the number of times it is desired to trip the drum-indexing mechanism during one revolution of the disk 199; and when the index dial 181 has moved to a point where the roller 207 on the arm 206 drops into the space left by the removal of block or blocks 187, the arm 204 is withdrawn from dog 196, allowing the latter to clutch with the constantly rotating ratchet-ring 195 until roller 202 engages and lifts the nose 131ª of the arm 131 (Fig. 26) thereby rocking shaft 130, and, through arm 129 connected to trip-rod 123, actuating the drum-tripping mechanism and setting in motion the next operation to be performed. This last described mechanism is especially useful for effecting a fine facing feed with a broad shaving cutter and for allowing the spindle to make a certain number of revolutions without having any feed engaged, thereby removing the tool-mark which would be left on the work if the back-traverse mechanism was set in operation as soon as the fine feed was disengaged, since it would be impracticable to set two trip-blocks on the table 135 so close together that the block 141 would trip them within a few thousandths of an inch of each other, which is the amount of stock usually taken off with a broad finishing cutter. With the method shown it is possible to have the spindle rotate from two to ten or more revolutions at a fine feed of a few thousandths per revolution after the coarse feed ordinarily used in turning the outside diameter of a casting has been tripped. In practice, the blocks 187 are placed on every space on the back of the index dial, thus holding the arm 206 away from the periphery of the index dial at all times except when it is desired to trip the fine feed.

In the front wall of the housing opposite the drums 12 and 13 are formed openings 208 and 209, respectively; and above said openings are secured over-hanging hoods 210 and 211. To the outer face of the hood 210 is secured a series of index-plates 212, 213, 214, and 215,—one for each of the levers 18, 15, 19, and 38, respectively. The index plates 212, 213, and 214 indicate the several spindle speeds obtainable by the shifting of the levers 18, 15, and 19, four different speeds being obtainable by the levers 18, and 19 without reference to the lever 15, and each of these four speeds being variable in the ratio of one to six and one-quarter, according to the position of the lever 15 which determines the drive of the spindle direct or through the planetary gear. The index plate 215 bears numbers indicating the proper position of the cam-block on the drum in order to effect, through the lever 38, the feed and traverse movements of the cross-slide. To the outer sides of the levers 18, 15, 19, and 38 are secured pointers 216 that project laterally beneath and above the lower edge of the hood 210 and overlie the several index plates so as to readily show to which side the lower end of each lever must be shifted to obtain a certain speed or feed and consequently the position which the cam-block must take on the drum in order to so shift the lever. Similarly, on the outer side of the hood 211 are index plates 217, 218, 219 and 220. The index plate 127 bears numbers indicating the fine feeds obtainable by shifting the lever 55, and the index plate 219 bears similarly positioned numbers indicating the roughing feeds obtainable by shifting the lever 56; and each plate bears numbers indicating which one of the four positions of the cam-block must be employed to secure any one of the desired feeds. The index plate 218 indicates the proper shifting of the lever 91 to secure the forward and back traverse of the turret-slide, or the in and out traverse of the cross-slide and also numbers indicating the correct position of the cam-block, accordingly as a forward or back traverse is desired. The index plate 220 gives directions for the correct position of the cam-block in order to throw the turret-slide movement into or out of action; and the levers 55, 91, and 56 are also provided with pointers 221 having the same functions as the pointers 216.

In Figs. 34 to 36 inclusive I have illustrated a mechanism which may be employed, if desired, to effect either a manual or a power traverse or feed of the cross-slide carriage 9 longitudinally of the main ways 2 of the bed, such means also including means for automatically stopping or changing the traverse or feed. Referring to said figures, 222 designates a sliding clutch-member keyed on the screw-shaft 46 and adapted to be thrown into and out of engagement with a coöperating clutch 223 carried by the spiral gear 47, this latter being loose on the screw. The clutch 222 is shifted into and out of engagement with clutch 223 by a hand-lever 224 (Fig. 1) fast on the hub of a pinion 225 (Fig. 34), which pinion meshes with annular teeth 226 on the clutch-sleeve 222; so that, when it is desired to operate the cross-slide 10 on the carriage 9, the clutch 222 is shifted into engagement with the clutch 223. 227 designates a bronze nut on the screw 46 which normally revolves therewith when the cross-feed is being used. Nut 227, which is confined against endwise movement relatively to the carriage 9 by flanges 228 and 229 on the ends thereof engaging shoulders formed on the carriage 9, is formed with an external spiral gear 230 meshing with a spiral gear 231 on a stub-shaft 232 journaled in the carriage 9 or in a stationary bracket 233 secured to the front face of said carriage. Splined on the projecting end of the stub shaft 232 is a slidable clutch-sleeve 234 coöperating at its inner end with a stationary clutch 235 on the bracket 233, and at its outer end having a squared hole 236 (Fig. 36) constituting a wrench-hold. When it is desired to move the cross-slide carriage 9 longitudinally of the ways of the bed by hand, the clutch 222 is thrown out by the arm 224, the clutch 234 is disengaged from the clutch 235, and a wrench is applied to the wrench-hold 236, whereby the nut 227 may be rotated in either direction on the screw 46, thus feeding the carriage 9 lengthwise of said screw according to the direction in which the shaft 232 is turned. When, however, it is desired to effect a power traverse or feed of the cross-slide carriage longitudinally of the ways of the bed, this may be done by first disconnecting the clutch 222, as before, then locking the shaft 232 against rotation by moving clutch 234 into engagement with clutch 235, and applying power to the shaft 46 in the manner and through the means hereinbefore described. The extent of this power traverse or feed is determined, and the traverse or feed automatically arrested, or the feed changed, by a drum-indexing mechanism similar to that employed on the cross-slide 10, which drum-indexing mechanism may also conveniently be connected to and operate through a part of the stop-table mechanism for tripping the turret traverse and feed. To this end the front face of the carriage 9 is formed with a depending extension 237 having longitudinally thereof a dovetail slot 238 adapted to receive holders 239, 240, and 241 carrying trip-dogs 242, 243, and 244, respectively, similar in all respects to the trip-dogs 161, 162, and 165 of the cross-slide, said holders being adjustably mounted in the slot 238, and the dogs adapted to engage and depress a spring-pin 245 slidably mounted in a keeper 246 on the machine frame, said pin 245 actuating one arm of a bell-crank lever 247 pivoted to the frame at 248 and having a link 249 connecting the other arm of the bell-crank lever with the link 144 of the turret-tripping mechanism. In this connection it may be noted that the shaft 137 of the turret-tripping mechanism is provided with an arm 250, through which the mechanism for tripping the turret traverse and feed may be operated manually, if desired.

From the foregoing it will be understood that the last described mechanism effects the same automatic operation and control of the cross-slide carriage longitudinally on the ways of the bed that is effected by the substantially similar mechanism hereinbefore described in respect to the traverse and feed of the cross-slide itself transversely of the ways of the bed; although, for the sake of clearness, and to avoid overcrowding and confusion in the illustration, I have not attempted to show this last described mechanism in the main views of the machine.

In the practical operation of the machine, to perform a given piece of work, the operator at first determines the number of different operations required thereon by the tools carried by the turret and cross-slide, either or both, and also what these several operations will be. That is, he knows or ascertains in advance the number and kinds of roughing feeds and the number and kind of fine or finishing feeds and their proper order and succession that will be required of the turret tools, the number and kind of roughing and finishing feed movements that will be required of the cross-slide tool, the number and proper relation in the job of the rapid traverse movements of both the turret and cross-slide, the proper spindle speeds to be thrown into operation according to the diameter of the work, kind of material, and character of the feeds given to the turret and cross-slide, and the number of spindle revolutions necessary to trip the fine facing feed, when required. He then secures cam-blocks on the successive spaces of the head-stock and turret drums 12 and 13, respectively, in positions to properly actuate the several levers, respectively, controlled by said cam-blocks. The operator also sets the trip-blocks 138 and 139 on the turret-operated table 135, in order to arrest and throw in the rapid traverse and feed movements of the turret at the proper times; and he also secures pointers 169 on the cross-slide carriage in proper relation to the dogs carried by the cross-slide or slides to determine the throwing in and out of the rapid traverse and feed movements of the latter at the proper times. In practice, this priming of the machine may be greatly facilitated, especially for new or inexperienced operatives, by means of charts which show the proper spindle speeds and the proper cross-slide and turret-feeds to be given according to the tools used and the operations to be performed, and the proper positions of the cam-blocks in the several slots of the drums in order to obtain the desired or required consecutive movements, speeds and feeds of the coöperating parts. Such charts will also preferably show the cutting speed in feet per minute according to the spindle speed and diameter of the work, and also a change-gear chart showing the proper change gears to be used to secure any particular finishing and roughing turret feeds, and the feed per revolution and cuts per inch obtainable with any given set of change-gears. If any given job does not require the full number of operations represented by the number of slots in the intermittently movable drums, blocks 184 will be placed on the front of the dial disk 181 corresponding to the unused spaces on the drums; and where a fine feed is to be tripped out or tool marks removed, one or more cam-blocks 187 will be removed from the rear face of the index dial 181 at the proper relative point where such operations are to be effected, and the roller 202 will be set in the proper hole 200 of the dial disk 199, according to the number of spindle revolutions to be made during such operations.

I claim—

1. In a machine of the character described, the combination with a machine bed and a tool-carrier mounted thereon, of means, including a clutch, for transmitting movement to said tool-carrier, a clutch-shifting lever, an intermittently movable drum-shaft, a drum fast thereon carrying a series of cams adapted to act successively upon said lever, drum-shaft rotating means, means independent of said drum-shaft normally maintaining said drum-shaft rotating means idle, and means actuated by the tool-carrier during its travel for tripping out of action said last named means, substantially as described.

2. In a machine of the character described, the combination with a machine bed and a tool-carrier mounted thereon, of means, including a plurality of clutches, for transmitting traverse and feed movements to said tool-carrier, clutch-shifting levers, an intermittently movable drum-shaft, a drum fast thereon carrying cams adapted to act upon said levers, respectively, drum-shaft rotating means, means independent of said drum-shaft normally maintaining said drum-shaft rotating means idle, and means actuated by the tool-carrier during its travel for tripping out of action said last named means, substantially as described.

3. In a machine of the character described, the combination with a machine bed and a tool-carrier mounted thereon, of means, including a plurality of clutches, for transmitting in-and-out traverse movements and a plurality of feed movements to said tool-carrier, a clutch-shifting lever controlling said traverse movements, a plurality of clutch-shifting levers controlling said feed movements, an intermittently movable drum-shaft, a drum fast thereon carrying cams adapted to act upon said levers, drum-shaft rotating means, means independent of said drum-shaft normally maintaining said drum-shaft rotating means idle, and means actuated by the tool-carrier during its travel for tripping out of action said last named means, substantially as described.

4. In a machine of the character described, the combination with a machine bed and a tool-carrier mounted thereon, of a drive-shaft, an intermediate shaft, clutch-controlled devices for driving said intermediate shaft in either direction from said drive-shaft, clutch-controlled devices on said intermediate shaft for transmitting different rates of feed or speed thereto, power-transmission mechanism between said intermediate shaft and said tool-carrier, a plurality of levers controlling the clutches of said devices, an intermittently movable drum carrying cams adapted to act upon said levers, normally idle means for rotating said drum, and means actuated by the tool-carrier during its travel for tripping into action said drum-rotating means, substantially as described.

5. In a machine of the character described, the combination with a machine bed and a tool-carrier mounted thereon, of a chuck-spindle, a variable speed mechanism, including a clutch, for transmitting rotary movement to said chuck-spindle, a clutch-shifting lever, an intermittently movable drum-shaft, a drum fast thereon carrying a cam adapted to act upon said lever, drum-shaft rotating means, means independent of said drum-shaft normally maintaining said drum-shaft rotating means idle, and means actuated by the tool-carrier for tripping out of action said last named means, substantially as described.

6. In a machine of the character described, the combination with a machine bed and a tool-carrier mounted thereon, of a chuck-spindle, a variable speed mechanism, including a plurality of clutches, for transmitting rotary movement to said chuck-spindle, clutch-shifting levers, an intermittently movable drum-shaft, a drum fast thereon, a plurality of cam-blocks detachably and adjustably secured to the surface of said drum and adapted to operate said levers in either direction, drum-shaft actuating means for imparting to said drum a step-by-step rotary movement, means independent of said drum-shaft normally maintaining said drum-shaft actuating means idle, and means actuated by the tool-carrier for tripping out of action said last named means, substantially as described.

7. In a machine of the character described, the combination with a machine bed and a cross-slide mounted thereon, of means, including a forward and reverse clutch mechanism, for transmitting forward and back traverse and different feed movements to said cross-slide, cam-actuated means for selecting said traverse and feed movements, a lever for actuating said forward and reverse clutch mechanism, intermittently movable cam mechanism for actuating said lever, and means controlled by said cross-slide during its travel for throwing into action said intermittently movable cam mechanism, substantially as described.

8. In a machine of the character described, the combination with a machine bed and a cross-slide mounted thereon, of means, including a plurality of clutches and a forward and reverse clutch mechanism, for transmitting forward and back traverse and different feed movements to said cross-slide, a plurality of clutch-controlling members for selecting said traverse and feed movements, a lever for actuating said forward and reverse clutch mechanism, a plurality of levers for actuating said clutch-controlling members, respectively, intermittently movable cam mechanism for actuating all of said levers, and means controlled by said cross-slide during its travel for throwing into action said intermittently movable cam mechanism, substantially as described.

9. In a machine of the character described, the combination with a machine bed and a cross-slide mounted thereon, of means, including a forward and reverse clutch mechanism, for transmitting forward and back traverse and different feed movements to said cross-slide, cam actuated means for selecting said traverse and feed movements, a lever for actuating said forward and reverse clutch mechanism, an inermittently movable drum carrying cams adapted to actuate said lever, normally idle means for rotating said drum, and means actuated by the cross-slide during its travel for tripping into action said drum-rotating means, substantially as described.

10. In a machine of the character described, the combination with a machine bed and a cross-slide mounted thereon, of means, including a plurality of clutches and a forward and reverse clutch mechanism, for transmitting forward and back traverse and different feed movements to said cross-slide, a plurality of clutch-controlling members for selecting said traverse and feed movements, a lever for actuating said forward and reverse clutch mechanism, a plurality of levers for actuating said clutch-controlling members, respectively, an intermittently movable drum shaft, a drum on said shaft carrying a cam adapted to engage said first named lever, another drum on said shaft carrying a plurality of cams adapted to engage said plurality of levers, respectively, normally idle means for rotating said drum-shaft, and means actuated by the cross-slide during its travel for tripping into action said drum-shaft rotating means, substantially as described.

11. In a machine of the character described, the combination with a machine-bed, a cross-slide carriage mounted thereon, and a cross-slide mounted on said carriage, of mechanism for transmitting traverse and feed movements to said cross-slide, a controlling mechanism for said traverse and feed-actuating mechanism, normally idle means for actuating said controlling mechanism, and means for tripping into action said normally idle actuating means, the same including coöperating stop devices adjustably mounted on said cross-slide and cross-slide carriage, respectively, substantially as described.

12. In a machine of the character described, the combination with a machine bed, and a cross-slide carriage mounted to slide on and longitudinally of said machine bed, of mechanism for transmitting traverse and feed movements to said cross-slide carriage, an intermittently movable cam drum controlling said traverse and feed-actuating mechanism, normally idle means for actuating said cam drum, and means for tripping into action said normally idle actuating means after a predetermined extent of movement of said carriage, substantially as described.

13. In a machine of the character described, the combination with a tool carrier, of a mechanism for automatically controlling the movement of said tool-carrier, comprising, in combination, a drum-shaft mounted for rotary movement, a drum fast thereon, cam blocks adjustably mounted on said drum and adapted to throw into and out of operation the actuating mechanism of said tool-carrier, drum-shaft rotating means, means independent of said drum-shaft normally maintaining said drum-shaft rotating means idle, and means actuated by the tool-carrier during the travel of the latter for tripping out of action said last named means, substantially as described.

14. In a machine of the character described, the combination with a tool carrier, of a mechanism for automatically controlling the movement of said tool-carrier, comprising, in combination, a drum-shaft mounted for rotary movement, a drum fast thereon, cam blocks adjustably and detachably mounted on said drum and adapted to throw into and out of operation the actuating mechanism of said tool-carrier, drum-shaft actuating means for imparting to said drum a step-by-step rotary movement, means independent of said drum-shaft normally maintaining said drum-shaft actuating means idle, and means actuated by the tool-carrier during the travel of the latter for tripping out of action said last named means, substantially as described.

15. In a machine of the character described, the combination with a tool carrier, of a mechanism for automatically controlling the movement of said tool-carrier, comprising, in combination, a drum mounted for rotary movement, cam-blocks detachably mounted on said drum and adapted to throw into and out of operation the actuating mechanism of said tool-carrier, a drive-shaft, gearing intermediate said drive-shaft and drum including a normally open clutch, means actuated by said tool-carrier during its travel for closing said normally open clutch, and means for automatically opening said clutch after a predetermined extent of rotary movement has been imparted to said drum, substantially as described.

16. In a machine of the character described, the combination with a tool carrier, of a mechanism for automatically controlling the movement of said tool-carrier, comprising, in combination, a drum mounted for rotary movement, cam-blocks detachably mounted on said drum and adapted to throw into and out of operation the actuating mechanism of said tool-carrier, a drive-shaft, gearing intermediate said drive-shaft and drum including a normally open clutch, means actuated by said tool-carrier during its travel for closing said normally open clutch, means for automatically opening said clutch after a single revolution of the latter, and means for rendering inoperative said clutch-opening means throughout a predetermined number of revolutions of said clutch, substantially as described.

17. In a machine of the character described, the combination with a tool carrier, of a mechanism for automatically controlling the movement of said tool-carrier, comprising, in combination, a drum mounted for rotary movement, cam-blocks detachably mounted on said drum and adapted to throw into and out of operation the actuating mechanism of said tool-carrier, a drive-shaft, gearing intermediate said drive-shaft and drum including a continuously rotating clutch-member geared to said drive-shaft and a normally idle clutch member geared to said drum, means normally urging said clutch members into engagement with each other, means including a trip mechanism normally holding said clutch members separated, and means actuated by said tool-carrier during its travel for actuating said trip mechanism whereby to release said clutch-separating means, substantially as described.

18. In a machine of the character described, the combination with a tool carrier, of a mechanism for automatically controlling the movement of said tool-carrier, comprising, in combination, a drum mounted for rotary movement, a plurality of cam blocks detachably secured to the circumference of said drum at equally spaced positions around the latter and adapted to throw into and out of operation the actuating mechanism of said tool-carrier, normally idle means for imparting to said drum a step-by-step rotary movement corresponding with the number of cam block positions around the circumference of said drum, and means actuated by said tool-carrier during its travel for tripping into action said drum-rotating means, substantially as described.

19. In a machine of the character described, the combination with a tool carrier, of a mechanism for automatically controlling the movement of said tool-carrier, comprising, in combination, a drum mounted for rotary movement, a plurality of cam blocks detachably secured to the circumference of said drum at equally spaced positions around the latter and adapted to throw into and out of operation the actuating mechanism of said tool-carrier, drum-actuating means for imparting to said drum a step-by-step rotary movement, means normally maintaining said drum-actuating means idle, an index dial geared to and rotating in unison with said drum and having peripheral divisions corresponding with the number of cam block positions around the circumference of said drum, blocks adapted to be secured to the periphery of said dial at points corresponding with unused cam block positions on said drum, and means actuated by said dial blocks for holding out of action said last named means, substantially as described.

20. In a machine of the character described, the combination with a tool carrier, of a mechanism for automatically controlling the movement of said tool-carrier, comprising, in combination, a drum mounted for rotary movement, a plurality of cam blocks detachably secured to the circumference of said drum at equally spaced positions around the latter and adapted to throw into and out of operation the actuating mechanism of said tool-carrier, a drive-shaft, gearing intermediate said drive-shaft and drum including a normally open clutch, means actuated by said tool-carrier during its travel for closing said normally open clutch, means for automatically opening said clutch after a single revolution of the latter, an index dial geared to and rotating in unison with said drum and having peripheral divisions corresponding with the number of cam block positions around the circumference of said drum, blocks adapted to be secured to the periphery of said dial at points corresponding with unused cam block positions on said drum, and means actuated by said dial blocks for rendering inoperative said clutch-opening means, substantially as described.

21. In a machine of the character described, the combination with a chuck-spindle, means for driving the same, a tool holder, and feed mechanism for the latter, of a dial disk geared to rotate in a fixed ratio to the spindle, a stud adapted to be secured at any one of a predetermined number of spaced positions around the periphery of said dial disk, and mechanism actuated by said stud for automatically arresting the operation of said feed mechanism after the spindle has made a number of revolutions during the feed determined by the position of said stud on said dial disk, substantially as described.

22. In a machine of the character described, the combination with a chuck-spindle, means for driving the same, a tool holder, and feed mechanism for the latter, of normally idle mechanism for automatically arresting the operation of said feed mechanism, a dial disk geared to rotate in a fixed ratio to the spindle, a stud adapted to be secured at any one of a predetermined number of spaced positions around the periphery of said dial disk, and mechanism actuated by said stud for tripping into action said normally idle mechanism after the spindle has made a number of revolutions during the feed determined by the position of said stud on said dial disk, substantially as described.

23. In a machine of the character described, the combination with a chuck-spindle, means for driving the same, a tool holder, and feed mechanism for the latter, of a controlling mechanism for said feed mechanism, normally idle means for actuating said controlling mechanism, a dial disk geared to rotate in a fixed ratio to the spindle, a stud adapted to be secured at any one of a predetermined number of spaced positions around the periphery of said dial disk, and mechanism actuated by said stud for tripping into action said normally idle means after the spindle has made a number of revolutions during the feed determined by the position of said stud on said dial disk, substantially as described.

24. In a machine of the character described, the combination with a chuck-spindle, means for driving the same, a tool-holder, and feed-actuating mechanism for the latter, of a controlling mechanism for said feed-actuating mechanism, normally idle means for actuating said controlling mechanism, a tripping mechanism adapted to set in action said normally idle actuating means, other normally idle means for operating said tripping mechanism, and manually set mechanism having a geared relation to said controlling mechanism adapted to set in action said other normally idle means after a predetermined number of spindle revolutions, substantially as described.

WILLIAM L. MILLER.

Witnesses:
M. E. GAECKS,
R. S. ALL.